US011922888B2

(12) United States Patent
Hong

(10) Patent No.: US 11,922,888 B2
(45) Date of Patent: Mar. 5, 2024

(54) DISPLAY DEVICE, DATA DRIVING CIRCUIT AND DISPLAY DRIVING METHOD

(71) Applicant: LG DISPLAY CO., LTD., Seoul (KR)

(72) Inventor: Mookyoung Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/837,194

(22) Filed: Jun. 10, 2022

(65) Prior Publication Data

US 2023/0037207 A1 Feb. 2, 2023

(30) Foreign Application Priority Data

Jul. 29, 2021 (KR) ........................ 10-2021-0099714

(51) Int. Cl.

| | |
|---|---|
| ***G09G 3/3275*** | (2016.01) |
| ***G09G 3/20*** | (2006.01) |
| ***G09G 3/3233*** | (2016.01) |
| ***G09G 3/3266*** | (2016.01) |

(52) U.S. Cl.

CPC ......... *G09G 3/3275* (2013.01); *G09G 3/2074* (2013.01); *G09G 3/3233* (2013.01); *G09G 3/3266* (2013.01); *G09G 2300/0842* (2013.01); *G09G 2310/027* (2013.01); *G09G 2310/0286* (2013.01); *G09G 2310/0291* (2013.01); *G09G 2310/08* (2013.01); *G09G 2320/0233* (2013.01); *G09G 2320/0247* (2013.01); *G09G 2320/041* (2013.01); *G09G 2320/10* (2013.01); *G09G 2330/021* (2013.01); *G09G 2340/0435* (2013.01)

(58) Field of Classification Search

None

See application file for complete search history.

(56) References Cited

U.S. PATENT DOCUMENTS

| | | | | |
|---|---|---|---|---|
| 8,847,940 | B2 * | 9/2014 | Chung ................. | G09G 3/3208 345/76 |
| 2013/0249969 | A1 * | 9/2013 | Jeon ..................... | G09G 3/3685 345/99 |
| 2015/0145901 | A1 * | 5/2015 | Lee ...................... | G09G 3/3614 345/96 |
| 2015/0294617 | A1 * | 10/2015 | Yoon .................... | G09G 3/3225 345/212 |
| 2016/0365058 | A1 * | 12/2016 | Nam .................... | G09G 3/3696 |
| 2017/0076660 | A1 * | 3/2017 | Lee ...................... | G09G 3/3208 |
| 2018/0211602 | A1 * | 7/2018 | Cho ...................... | G09G 3/3258 |
| 2020/0251045 | A1 * | 8/2020 | An ........................ | H02H 1/0007 |
| 2022/0051599 | A1 * | 2/2022 | Kang ....................... | G09G 3/20 |
| 2023/0005411 | A1 * | 1/2023 | Yoon ..................... | G06F 1/3262 |

* cited by examiner

*Primary Examiner* — Nitin Patel
*Assistant Examiner* — Amen W Bogale
(74) *Attorney, Agent, or Firm* — POLSINELLI PC

(57) ABSTRACT

A display device includes a gamma driving power detection circuit for detecting the gamma driving power for driving the data driving circuit and may control digital image data supplied to the data driving circuit according to the gamma driving power measurement detected by the gamma driving power detection circuit, thereby reducing an increase in the temperature of the data driving circuit and enhancing image quality.

18 Claims, 16 Drawing Sheets

(D)

(a)

(b)

DISPLAY DEVICE, DATA DRIVING CIRCUIT AND DISPLAY DRIVING METHOD

CROSS-REFERENCE TO RELATED APPLICATION

This application claims the priority of Korean Patent Application No. 10-2021-0099714, filed on Jul. 29, 2021, which is hereby incorporated by reference in its entirety.

FIELD OF THE DISCLOSURE

The present disclosure relates to a display device, a data driving circuit, and a display driving method capable of alleviating a temperature rise of a driving circuit according to a change in data.

DESCRIPTION OF THE BACKGROUND

As the information society develops, various demands for display devices for displaying images are increasing, and various types of display devices, such as liquid crystal display (LCD) and organic light emitting display (OLED), are used.

Among these display devices, the organic light emitting display adopts organic light emitting diodes and thus has fast responsiveness and various merits in contrast ratio, luminous efficiency, luminance, and viewing angle.

The organic light emitting display include organic light emitting diodes in subpixels arranged on the display panel and emits light by controlling the current flowing to the organic light emitting diodes, thereby controlling the luminance represented by each subpixel while displaying an image.

The subpixels are driven by scan signals applied through gate lines, and gray levels are represented according to the data voltages applied through data lines according to the timings when the scan signals are applied, displaying an image. The data lines to which the data voltages are applied may be arranged one for each subpixel column.

The display panel may come in various structures. As the display performance is enhanced, demand for large-scale, high-resolution display panels is gradually increasing. As the area and resolution of the display panel increase, the amount of image data displayed through the display panel increases, and transition of image data is frequent. Accordingly, the temperature of the display panel, as well as the data driving circuit for supplying the data voltage, rises. As such, as the transition of the image data supplied to the display device increases, the temperature of the data driving circuit and the display panel rises, degrading image quality.

SUMMARY

Accordingly, the present disclosure is to provide a display device, a data driving circuit, and a display driving method which may reduce an increase in the temperature of the data driving circuit due to a transition of image data.

More specifically, the present disclosure is to provide a display device, a data driving circuit, and a display driving method which may reduce an increase in the temperature of the data driving circuit by controlling the data voltage according to a variation in the gamma driving power applied to the data driving circuit.

The present disclosure is also to provide a display device, a data driving circuit, and a display driving method which may reduce an increase in the temperature of the data driving circuit by controlling the level or refresh rate of the data voltage according to a variation in the gamma driving power applied to the data driving circuit.

Further, the present disclosure is to provide a display device, a data driving circuit, and a display driving method which may effectively reduce an increase in the temperature of the data driving circuit regardless of the structure of the subpixels constituting the display panel by detecting a variation in the gamma driving power applied to the data driving circuit.

In an aspect of the present disclosure, a display device includes a display panel where a plurality of gate lines, a plurality of data lines, and a plurality of subpixels are disposed, a gate driving circuit configured to supply a scan signal to the plurality of gate lines, a data driving circuit configured to convert digital image data into an analog data voltage and supplying the analog data voltage to the plurality of data lines, a power management circuit configured to supply a gamma driving power for driving the data driving circuit to the data driving circuit and include a gamma driving power detection circuit for detecting the gamma driving power, and a timing controller configured to control the gate driving circuit and control the data driving circuit to change the analog data voltage supplied to the display panel according to a gamma driving power measurement detected by the gamma driving power detection circuit.

In another aspect of the present disclosure, a data driving circuit includes a shift register configured to convert digital image data received in a serial form into image data in a parallel form and outputting the image data, a latch circuit configured to transfer the image data in the parallel form, on a per-line basis, to be simultaneously supplied to a plurality of source driving integrated circuits, a gamma circuit configured to generate a plurality of gamma reference voltages using gamma driving power, a digital-to-analog converter configured to convert the image data in the parallel form into an analog data voltage in response to the plurality of gamma reference voltages transferred from the gamma circuit, an output buffer supplying the analog data voltage to a display panel through a plurality of data lines, and a gamma driving power detection circuit configured to detect the gamma driving power.

In a further aspect of the present disclosure, a driving method for driving a display device includes a display panel where a plurality of gate lines, a plurality of data lines, and a plurality of subpixels are disposed, a gate driving circuit supplying a scan signal to the plurality of gate lines, and a data driving circuit converting digital image data into an analog data voltage and supplying the analog data voltage to the plurality of data lines, comprising detecting gamma driving power supplied to the data driving circuit, comparing a measurement of the gamma driving power with a reference value, controlling the analog data voltage when the gamma driving power measurement exceeds the reference value, and supplying the analog data voltage to the display panel.

According to the present disclosure, there may be provided a display device, a data driving circuit, and a display driving method which may reduce an increase in the temperature of the data driving circuit due to a transition of image data.

According to the present disclosure, there may be provided a display device, a data driving circuit, and a display driving method which may reduce an increase in the temperature of the data driving circuit by controlling the data voltage according to a variation in the gamma driving power applied to the data driving circuit.

According to the present disclosure, there may be provided a display device, a data driving circuit, and a display driving method which may reduce an increase in the temperature of the data driving circuit by controlling the level or refresh rate of the data voltage according to a variation in the gamma driving power applied to the data driving circuit.

According to the present disclosure, there may be provided a display device, a data driving circuit, and a display driving method which may effectively reduce an increase in the temperature of the data driving circuit regardless of the structure of the subpixels constituting the display panel by detecting a variation in the gamma driving power applied to the data driving circuit.

DESCRIPTION OF DRAWINGS

The above and other features and advantages of the present disclosure will be more clearly understood from the following detailed description, taken in conjunction with the accompanying drawings, in which.

DETAILED DESCRIPTION

Figure 1:
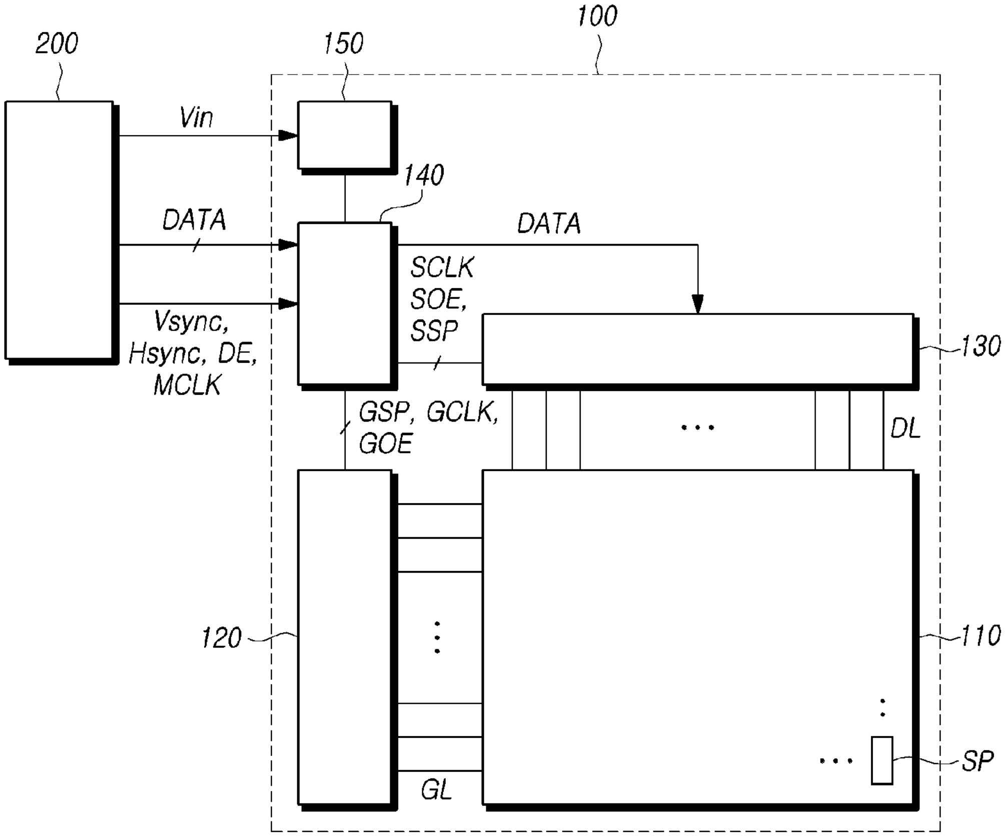
FIG. 1 is a view schematically illustrating a configuration of a display device according to the present disclosure.

Hereinafter, some aspects of the present disclosure will be described in detail with reference to exemplary drawings. In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the present disclosure will be described in detail with reference to the accompanying drawings.

FIG. 1 is a view schematically illustrating a configuration of a display device according to various aspects of the present disclosure.

Referring to FIG. 1, a display device 100 according to aspects of the present disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image based on a scan signal transferred from the gate driving circuit 120 through the plurality of gate line GLs and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be defined by the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed at the intersection between the gate line GL and the data line DL.

The gate driving circuit 120 may be controlled by the controller 140 to sequentially output scan signals to the plurality of gate lines GL disposed in the display panel 110, controlling the driving timing of the plurality of subpixels SP.

In the display device 100 having a resolution of 2,160×3,840, sequentially outputting the scan signal to the 2,160 gate lines GL from the first gate line to the 2,160$^{th}$ gate line may be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL may be referred to as N-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

Accordingly, the timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power required to drive the display panel 100, the gate driving circuit 120, and the data driving circuit 130.

The subpixel SP is positioned at the intersection between the gate line GL and the data line DL, and a light emitting element may be disposed in each subpixel SP. For example, the organic light emitting display may include a light emitting element, such as an organic light emitting diode, in each subpixel SP and may display an image by controlling the current flowing to the light emitting element according to the data voltage.

The display device 100 may be one of various types of devices, such as liquid crystal displays, organic light emitting displays, or plasma display panels.

Figure 2:
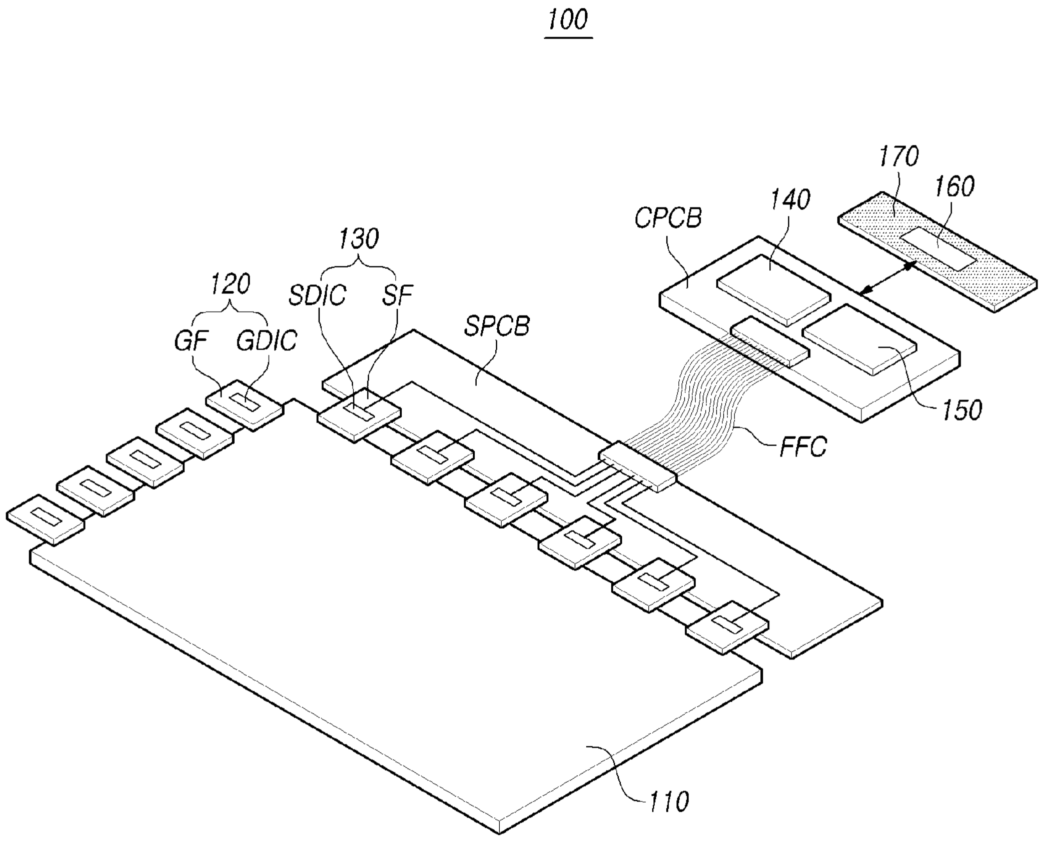
FIG. 2 is a view illustrating an example of a system of a display device according to the present disclosure.

FIG. 2 is a view illustrating an example of a system of a display device according to aspects of the present disclosure.

Referring to FIG. 2, in the display device 100 according to aspects of the present disclosure, the source driving integrated circuit SDIC included in the data driving circuit 130 and the gate driving integrated circuit GDIC included in the gate driving circuit 120 are implemented in the chip-on-film (COF) type among various types (e.g., TAB, COG, or COF).

One or more gate driving integrated circuits GDIC included in the gate driving circuit 120 each may be mounted on a gate film GF, and one side of the gate film GF may be electrically connected with the display panel 110. Lines for electrically connecting the gate driving integrated circuit GDIC and the display panel 110 may be disposed on the gate film GF.

Likewise, one or more source driving integrated circuits SDIC included in the data driving circuit 130 each may be mounted on the source film SF, and one side of the source film SF may be electrically connected with the display panel 110. Lines for electrically connecting the source driving integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit (power management IC) 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit (FPC) or a flexible flat cable (FFC). In this case, the connection member connecting the at least one source printed circuit board SPCB and control printed circuit board CPCB may be varied depending on the size and type of the display device 100. The at least one source printed circuit board SPCB and control printed circuit board CPCB may be integrated into a single printed circuit board.

In the so-configured display device 100, the power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include an organic light emitting diode, which is a light emitting element, and a circuit element, e.g., a driving transistor, for driving the organic light emitting diode.

The type and number of circuit elements constituting each subpixel SP may be varied depending on functions to be provided and design schemes.

Figure 3:
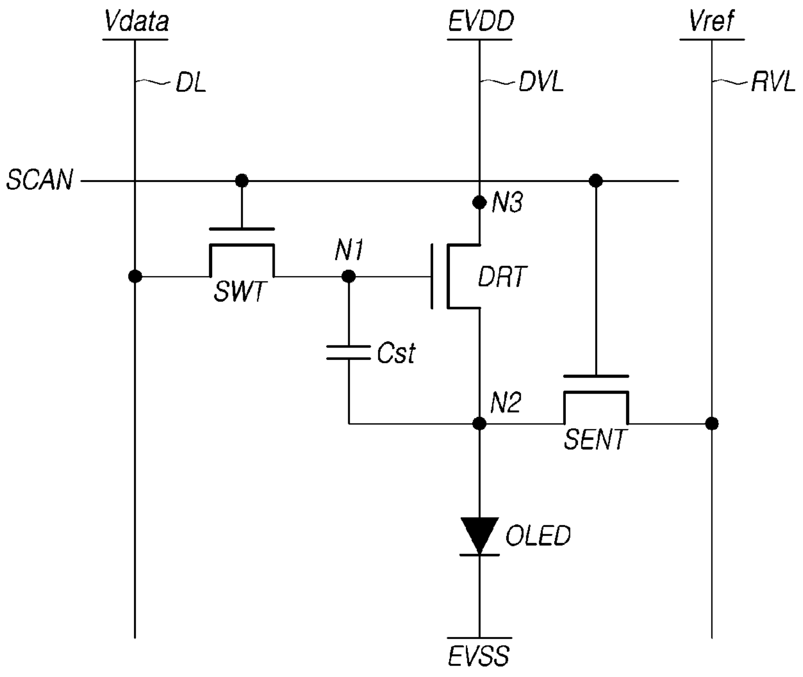
FIG. 3 is a view illustrating an example of a circuit constituting a subpixel in a display device according to the present disclosure.

FIG. 3 is a view illustrating an example of a circuit constituting a subpixel in a display device according to aspects of the present disclosure.

Referring to FIG. 3, in the display device 100 according to aspects of the present disclosure, the subpixel SP may include one or more transistors and a capacitor and an organic light emitting diode (OLED) as a light emitting element.

For example, the subpixel SP may include a driving transistor DRT, a switching transistor SWT, a sensing transistor SENT, a storage capacitor Cst, and an organic light emitting diode OLED.

The driving transistor DRT includes the first node N1, second node N2, and third node N3. The first node N1 of the driving transistor DRT may be a gate node to which the data voltage Vdata is applied from the data driving circuit 130 through the data line DL when the switching transistor SWT is turned on. The second node N2 of the driving transistor DRT may be electrically connected with the anode electrode of the organic light emitting diode OLED and may be the source node or drain node. The third node N3 of the driving transistor DRT may be electrically connected with the driving voltage line DVL to which the subpixel driving voltage EVDD is applied and may be the drain node or the source node.

In this case, during a display driving period, a subpixel driving voltage EVDD necessary for displaying an image may be supplied to the driving voltage line DVL. For example, the subpixel driving voltage EVDD necessary for displaying an image may be 27 V.

The switching transistor SWT is electrically connected between the first node N1 of the driving transistor DRT and the data line DL, and the gate line GL is connected to the gate node. Thus, the switching transistor SWT is operated according to the scan signal SCAN supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the sense signal SENSE supplied through the gate line GL. When the sensing transistor SENT is turned on, a sensing reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the organic light emitting diode OLED may be supplied.

The gate nodes of the switching transistor SWT and the sensing transistor SENT may be commonly connected to one gate line GL or may be connected to different gate lines GL. An example is shown in which the switching transistor SWT and the sensing transistor SENT are connected to different gate lines GL in which case the switching transistor SWT and the sensing transistor SENT may be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT may be simultaneously controlled by the scan signal SCAN or sense signal SENSE transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the organic light emitting diode OLED may be electrically connected with the second node N2 of the driving transistor DRT, and a base voltage EVSS may be applied to the cathode electrode of the organic light emitting diode OLED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The structure of the subpixel SP described above as an example is a 3T (transistor) 1C (capacitor) structure, which is merely an example for description, and may further include one or more transistors or, in some cases, one or more capacitors. The plurality of subpixels SP may have the same structure, or some of the plurality of subpixels SP may have a different structure.

To effectively sense a characteristic value, e.g., threshold voltage or mobility, of the driving transistor DRT, the display device 100 according to aspects of the present disclosure may use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel SP. Thus, the reference voltage line RVL may also be referred to as a sensing line.

Figure 4:
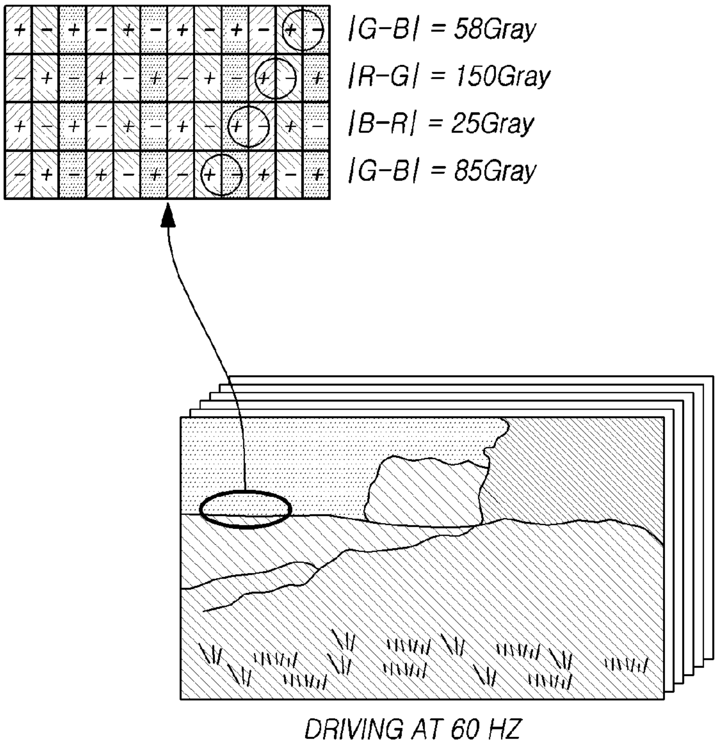
FIG. 4 is a view illustrating an example of a variation in an image displayed on a display panel in a display device according to the present disclosure.

FIG. 4 is a view illustrating an example of a variation in an image displayed on a display panel in a display device according to aspects of the present disclosure.

Referring to FIG. 4, in the display device 100 according to aspects of the present disclosure, the flicker of the image displayed on the display panel 110 may be caused by the transition of the data voltage Vdata, which is caused as the data voltages Vdata of the subpixels SP spatially adjacent to each other are not identical to each other or the data voltages Vdata between temporally adjacent frames are not identical to each other.

For example, luminance differences of 58 grayscales (58 Gray) may occur between the green subpixel G and blue subpixel B adjacent to each other, luminance differences of 150 grayscales (150 Gray) may occur between the red subpixel R and green subpixel G, and luminance differences of 25 grayscales (25 Gray) may occur between the blue subpixel B and red subpixel R. The luminance difference may occur due to a deviation in data voltage Vdata between adjacent subpixels SP or between adjacent frames.

In particular, when the driving frequency of the display panel 110 is high, a change in image due to the deviation in data voltage Vdata between adjacent subpixels SP or between adjacent frames may be easily perceived by the user.

In contrast, when the driving frequency of the display panel 110 is low, even a minute change in image between adjacent subpixels SP or between adjacent frames may be easily noticed to the user's eyes, and screen flickering or flashing occurs.

Such screen flicker occurs as several grayscales are scattered on the display panel 110, and the deviation from the common voltage which serves as a reference, for each grayscale differs. It is possible to control the transition level of the image data by calculating the complexity between adjacent subpixels SP or between adjacent frames.

For example, the timing controller 140 may control the driving frequency of the display panel 110 according to the transition of the image data shown between adjacent subpixels SP or between adjacent frames. In this case, the transition of image data may be calculated as the sum of the grayscale values of the data voltage Vdata between adjacent subpixels SP or between adjacent frames.

Typically, a moving image with frequent transition of image data may require a driving frequency of 60 Hz or more to represent a smooth motion, and a moving image or still image which has no or infrequent of the transition of image data may be operated at a low driving frequency because it has less motion.

As such, if the transition of the data voltage Vdata, which occurs due to a difference between the data voltages Vdata of spatially adjacent subpixels SP or between temporally adjacent frames, increases, the temperature of the data driving circuit 130, which supplies the data voltage Vdata to the display panel 110, may increase, deteriorating the image quality of the display panel 110.

Figure 5:
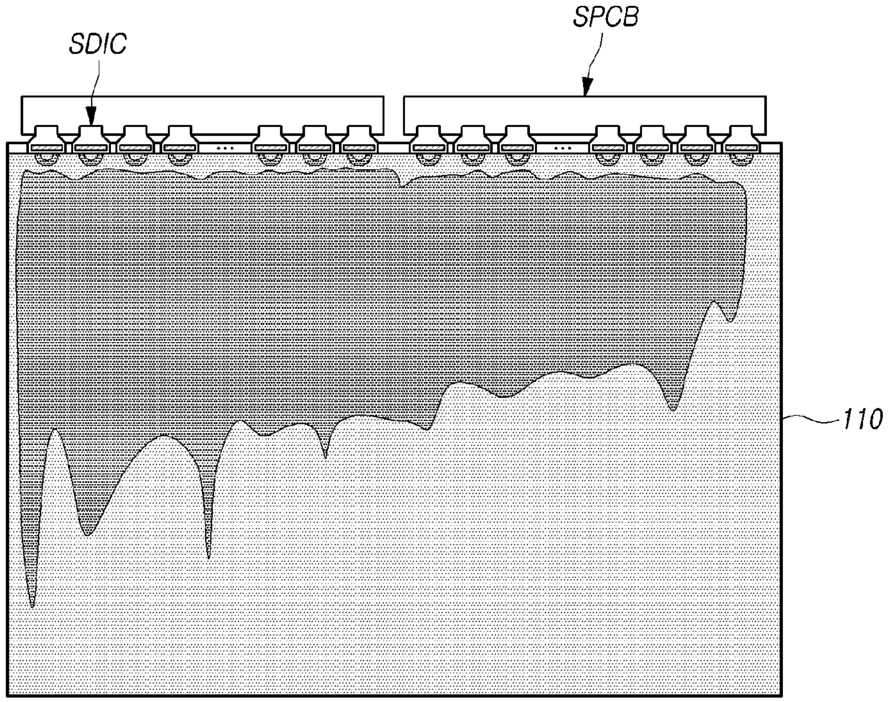
FIG. 5 is a view illustrating an example in which the temperature of a display panel increases due to a transition of a data voltage in a display device according to the present disclosure.

FIG. 5 is a view illustrating an example in which the temperature of a display panel increases due to a transition of a data voltage in a display device according to aspects of the present disclosure.

Referring to FIG. 5, in the touch display device 100 according to aspects of the present disclosure, the display panel 110 may be one of various types of panels including liquid crystal display panels or organic light emitting display panels.

The display panel 110 may provide not only an image display function but also the function of touch sensing by a passive stylus, e.g., a finger, or the function of pen touch sensing (pen recognition function) by an active stylus.

In the display panel 110 which provides both the image display function and the touch sensing function, the common electrode which, together with the pixel electrode, forms an electric field by receiving a common voltage during the display driving period, may be divided into a plurality of blocks to be used as a plurality of touch electrodes.

In a case where the display panel 110 is an organic light emitting diode panel, the display device 100 may include a first electrode, an organic light emitting layer, and a second electrode, which constitute an organic light emitting diode, an encapsulation layer positioned thereon to provide an encapsulation function, and a touch sensor metal layer positioned thereon. A plurality of touch electrodes may be formed on the touch sensor metal layer.

The data driving circuit 130 may include a plurality of source driving integrated circuits SDIC for driving the data lines DL arranged on the display panel 110. The data driving circuit 130 may be disposed only on one side of the display panel 110 or on two opposite sides thereof. In the shown example, the data driving circuit 130 is disposed on an upper side of the display panel 110.

The source driving integrated circuit SDIC may be formed in a chip-on-film (COF) type in which it is mounted on a film or a chip-on-glass (COG) type in which it is formed on a glass substrate. Although an example in which the source driving integrated circuit SDIC is of a COF type is shown, it is apparent to one of ordinary skill in the art that the source driving integrated circuit SDIC may be formed in a COG type.

The film or glass where the source driving integrated circuit SDIC is mounted may be coupled to each of the bonding portion of the display panel 110 and the bonding portion of the source printed circuit board SPCB.

The source driving integrated circuit SDIC may be coupled with a read-out integrated circuit for touch sensing and be implemented as a single integrated circuit.

In such a structure, when the display panel 110 has a large-scale, high resolution, the number of the source driving integrated circuits SDIC constituting the data driving circuit 130 increases, and the power consumption, as well as the temperature of the source driving integrated circuit SDIC, is increased due to the transition of the data voltage Vdata applied to the display panel 110.

In other words, as the area and resolution of the display panel increase, the amount of image data displayed through the display panel increases, and the transition of image data is more frequent. Accordingly, the temperature of the source driving integrated circuit SDIC supplying the data voltage to the display panel 110 increases, and so does the temperature of the display panel 110. As a result, the characteristic value of the driving transistor constituting the subpixel SP is affected, so that image quality is deteriorated.

Thus, the temperature of the area adjacent to the source driving integrated circuit SDIC among several areas of the display panel 110 is further increased, deteriorating image quality.

Such phenomenon may be more conspicuous when transition of image data is more frequent, like when the image data is of a game or moving image.

The display device 100 according to aspects of the present disclosure may control the refresh rate or level of the data voltage Vdata according to the transition of image data, thereby reducing an increase in the temperature of the display panel 110 and enhancing image quality.

Figure 6:
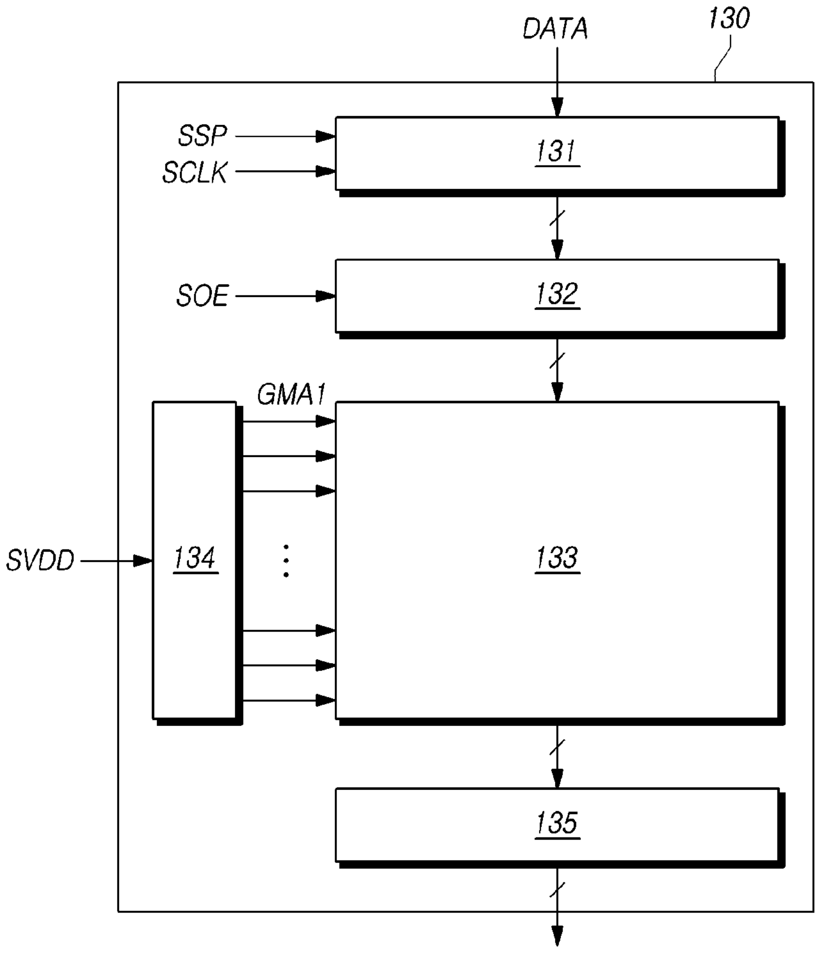
FIG. 6 is a view schematically illustrating a configuration of a data driving circuit in a display device according to the present disclosure.

FIG. 6 is a view schematically illustrating a configuration of a data driving circuit in a display device according to aspects of the present disclosure.

Referring to FIG. 6, in a display device 100 according to aspects of the present disclosure, a data driving circuit 130 may include a shift register 131, a latch circuit 132, a gamma circuit 134, a digital-to-analog converter 133, and an output buffer 135.

The data driving circuit control signal transferred from the timing controller 140 to control the data driving circuit 130 may include a source start pulse SSP, a source sampling clock SCLK, and a source output enable signal SOE.

The source start pulse SSP controls the data sampling start time of the data driving circuit 130. The source sampling clock SCLK is a clock signal that controls the image data sampling operation in the data driving circuit 130 based on a rising or falling edge. The source output enable signal SOE controls the output of the data driving circuit 130.

The shift register 131 shifts the image data DATA received as serial data in response to the source start pulse SSP and source sampling clock SCLK transferred from the timing controller 140 and then simultaneously outputs them.

Accordingly, the image data DATA which is serial data is converted into data of a parallel system which is then supplied to the latch circuit 132. The latch circuit 132 supplies one line of image data DATA to the digital-to-analog converter 133 so that the image data DATA is simultaneously transferred to the source driving integrated circuits SDIC according to the source output enable signal SOE.

At least two latch circuits 132 may be configured, but for convenience of description, only one latch circuit 132 is shown.

The gamma circuit 134 generates first to nth gamma reference voltages GMA1-GMAn using the gamma driving power SVDD supplied from the timing controller 140.

The digital-to-analog converter 133 converts one line of image data DATA into an analog data voltage Vdata in response to the first to nth gamma reference voltages GMA1-GMAn transferred from the gamma circuit 134.

The output buffer 135 amplifies or compensates for the analog data voltage Vdata transferred from the digital-to-analog converter 133 and supplies it to each data line DL.

The power of the gamma circuit 134, digital-to-analog converter 133, and output buffer 135 may be separated from each other and may share one gamma driving power SVDD.

Figure 7:
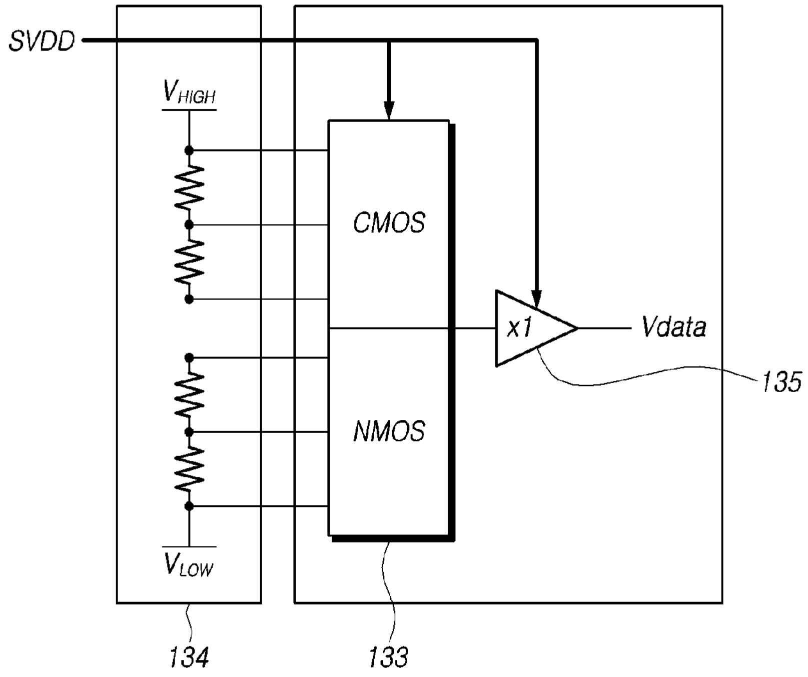
FIG. 7 is a view illustrating a partial configuration of a data driving circuit in a display device according to the present disclosure.

FIG. 7 is a view illustrating a partial configuration of a data driving circuit in a display device according to aspects of the present disclosure.

Referring to FIG. 7, a data driving circuit 130 in a display device 100 according to aspects of the present disclosure may include a gamma circuit 134, a digital-to-analog converter 133, and an output buffer 135.

In this case, the digital-to-analog converter 133 may include a CMOS transistor in which a PMOS transistor and an NMOS transistor are connected in parallel to each other.

The gamma circuit 134, the digital-to-analog converter 133, and the output buffer 135, which constitute the data driving circuit 130, may use the gamma driving power SVDD, supplied from the timing controller 140, as common driving power.

In contrast, when the gamma circuit 134, the digital-to-analog converter 133, and the output buffer 135 each use different driving power, the driving power applied to the digital-to-analog converter 133 and the output buffer 135 may be applied to a signal line different from that of the gamma driving power SVDD and be supplied with a different level of driving power from that of the gamma driving power SVDD.

Since the gamma circuit 134 generates gamma reference voltages GMA corresponding to a plurality of levels (e.g., 256 levels), the gamma circuit 134 generally consumes much current.

The gamma driving power SVDD may be varied by the timing controller 140 but is not easy to vary by the gamma circuit 134 which consumes much current and is typically fixed to a constant voltage.

However, if image data DATA with frequent transition, such as a moving image, is applied from the host system 200, the current of the output buffer 135 is dynamically varied significantly while the data voltage Vdata is supplied, so that the power consumption of the data driving circuit 130 is increased.

Figure 8:
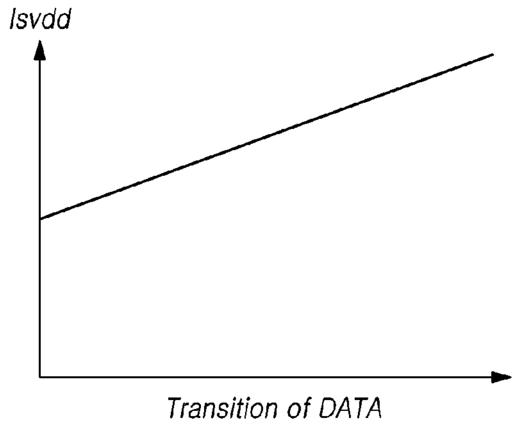
FIG. 8 is a view illustrating an example in which the current of the gamma driving power applied to a data driving circuit is varied due to a transition of image data in a display device according to the present disclosure.

FIG. 8 is a view illustrating an example in which the current of the gamma driving power applied to a data driving circuit is varied due to a transition of image data in a display device according to aspects of the present disclosure.

Referring to FIG. 8, in the display device 100 according to aspects of the present disclosure, if image data DATA with frequent transition is supplied from the host system 200, the current of the output buffer 135 is increased at the rising or falling edge which appears during the transition of the image data DATA or data voltage Vdata.

As the current of the output buffer 135 is so increased during the transition of the image data DATA or data voltage Vdata, the gamma driving power SVDD supplied to the gamma circuit 134 and output buffer 135 is increased, or so is the current Isvdd supplied to the data driving circuit 130 by the gamma driving power SVDD.

Recently adopted is a double-rate driving (DRD)-type structure in which one data line DL is disposed between two adjacent subpixels SP, and two subpixels SP disposed on two opposite sides of the data line DL are driven so as to reduce the number of source driving integrated circuits SDIC for driving the data line DL.

Figure 9:
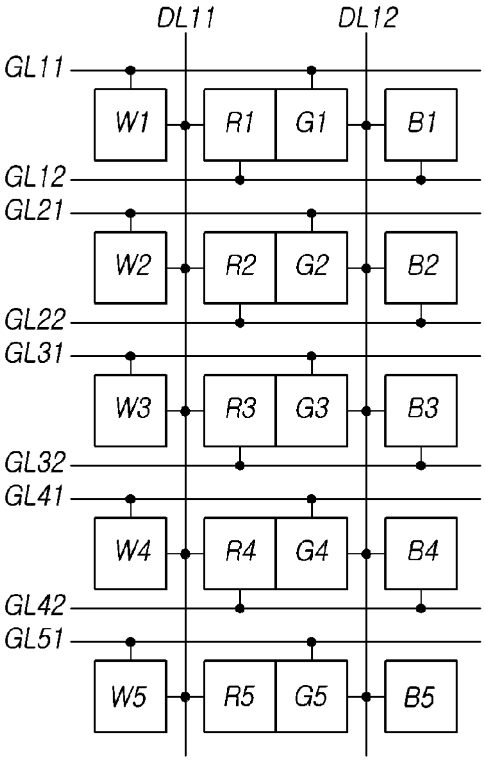
FIG. 9 is a view illustrating an example of a subpixel structure driven in a double-rate driving (DRD) scheme in a display device according to the present disclosure.

FIG. 9 is a view illustrating an example of a subpixel structure driven in a DRD scheme in a display device according to aspects of the present disclosure.

Referring to FIG. 9, the subpixels SP of the display device 100 according to aspects of the present disclosure may include a red subpixel R, a green subpixel G, a blue subpixel B, and a white subpixel W.

In the display panel 110 in the display device 100 driven in the DRD scheme, one data line DL is disposed every two columns of subpixels SP, and two gate lines GL may be disposed above and under each row of subpixels SP. In the shown example, the white subpixel W and the red subpixel R share one data line DL11, and the green subpixel G and the blue subpixel B share one data line DL12.

The white subpixel W and the green subpixel G may share the same gate line GL11, GL21, GL31, GL41, GL51, . . . , and the red subpixel R and the blue subpixel B may share the same gate line GL12, GL22, GL32, GL42, . . . .

Various changes may be made to the subpixel (SP) structure sharing the data line DL and the gate line GL. The white subpixel W and the green subpixel G or the red subpixel R and the blue subpixel B may share the data line DL, or the white subpixel W and the red subpixel R may share one gate line GL.

In the DRD structure, the data voltage Vdata may be supplied to two subpixels SP through one data line DL during one horizontal period (Horizontal Time), and the gate line GL may be driven at twice as high a frequency as normal driving, applying the scan signal SCAN to each subpixel SP.

To minimize flickers and reduce power consumption, the scan signal SCAN may be controlled so that the data voltage Vdata is alternately applied to the subpixels SP disposed on two opposite sides of one data line DL.

In this case, the display device 100 driven in the DRD scheme may also apply the polarity-inverted data voltage Vdata to each row of subpixels SP to reduce power consumption and minimize flickers. Accordingly, as the data voltage Vdata applied to the subpixel SP, a signal having the same polarity as the data voltage Vdata applied to the previous subpixel SP may be applied, or the polarity-inverted signal may be applied.

As such, the subpixel SP of the display device 100 may be formed in various structures, and the connection structure between the output buffer 135 of the data driving circuit 130 and the display panel 110 may be changed depending on the structure of the subpixel SP.

Accordingly, the transition pattern of the image data DATA, which increases the temperature of the data driving circuit 130, may differ depending on the structure of the subpixel SP. As a result, it may be hard to determine the pattern of the image data DATA which increases the temperature of the data driving circuit 130.

However, such an occasion that the current flowing to the output buffer 135 of the data driving circuit 130 may be increased due to the transition of image data DATA, so that the current of the gamma driving power SVDD is increased is a common phenomenon that may arise although the structure of the subpixel SP is changed.

Thus, the display device 100 according to aspects of the present disclosure reduces an increase in the temperature of the data driving circuit 130 by detecting a variation in the gamma driving power SVDD applied to the data driving circuit 130 and accordingly controlling the level or refresh rate of the image data DATA supplied to the data driving circuit 130 from the timing controller 140.

Figure 10:
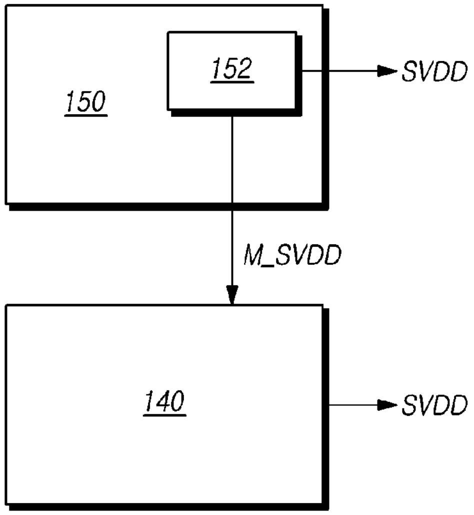
FIG. 10 is a system block diagram illustrating a structure of detecting a variation in gamma driving power to thereby control image data in a power management circuit of a display device according to aspects of the present disclosure.

FIG. 10 is a system block diagram illustrating a structure of detecting a variation in gamma driving power to thereby control image data in a power management circuit of a display device according to aspects of the present disclosure.

Referring to FIG. 10, a display device 100 according to aspects of the present disclosure may include a gamma driving power detection circuit 152 for measuring the gamma driving power SVDD, in the power management circuit 150 which generates various types of driving power.

The gamma driving power detection circuit 152 may be positioned in the power management circuit 150 and may supply the gamma driving power SVDD, generated by the power management circuit 150, to the data driving circuit 130 while simultaneously measuring a variation in the gamma driving power SVDD.

The gamma driving power measurement M_SVDD detected by the gamma driving power detection circuit 152 is transferred to the timing controller 140. The timing controller 140 may change the level or refresh rate of the image data DATA applied to the data driving circuit 130 with respect to the gamma driving power measurement M_SVDD transferred from the power management circuit 150.

For example, if the gamma driving power measurement M_SVDD transferred from the power management circuit 150 is less than a reference value, the timing controller 140 does not change the level or refresh rate of the image data DATA but, if the gamma driving power measurement M_SVDD transferred from the power management circuit 150 exceeds the reference value, the timing controller 140 reduces the level or refresh rate of the image data DATA, suppressing an increase in the temperature of the data driving circuit 130.

In this case, the timing controller 140 may refer to a lookup table stored in a memory (not shown), extract the compensation value corresponding to the gamma driving power measurement M_SVDD, and apply the extracted compensation value to the image data DATA, thereby changing the level or refresh rate of the image data DATA.

Specifically, the target to be changed by the timing controller 140 according to the gamma driving power measurement M_SVDD may be the level of the image data DATA or the refresh rate of the image data DATA. Alternatively, the timing controller 140 may simultaneously change the level of the image data DATA and the refresh rate of the image data DATA according to the gamma driving power measurement M_SVDD.

When the timing controller 140 changes the level of the image data DATA applied to the data driving circuit 130 according to the gamma driving power measurement M_SVDD, the level of the data voltage Vdata supplied from the data driving circuit 130 to the display panel 110 is to be changed according to the level of the image data DATA. Accordingly, the timing controller 140 may be regarded as changing the level of the data voltage Vdata supplied to the display panel 110 according to the gamma driving power measurement M_SVDD.

Figure 11:
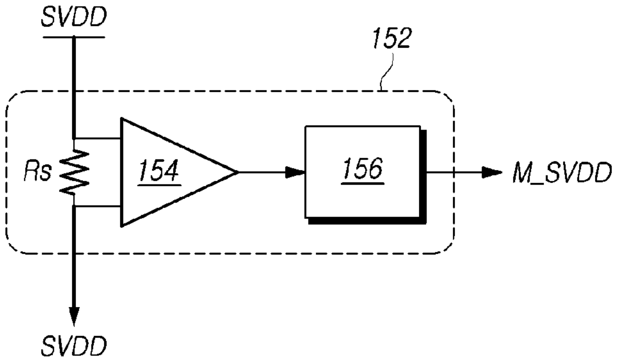
FIG. 11 is a view illustrating an example of a gamma driving power detection circuit in a display device according to aspects of the present disclosure.

FIG. 11 is a view illustrating an example of a gamma driving power detection circuit in a display device according to aspects of the present disclosure.

Referring to FIG. 11, in the display device 100 according to aspects of the present disclosure, the gamma driving power detection circuit 152 may include a current sensing resistor Rs, an operational amplifier 154, and an analog-to-digital converter 156.

The current sensing resistor Rs may be connected between the terminal where the gamma driving power SVDD is generated and the data driving circuit 130, generating a bias voltage according to the current flowing to the line through which the gamma driving power SVDD is supplied to the data driving circuit 130 from the power management circuit 150.

In this case, the current sensing resistor Rs may have a tiny resistance, e.g., 0.01Ω, to minimize the voltage drop of the gamma driving power SVDD.

The operational amplifier 154 may be connected between both the ends of the current sensing resistor Rs, sensing and amplifying the bias voltage applied between both the ends of the current sensing resistor Rs. For example, the operational amplifier 154 may amplify the bias voltage applied between both the ends of the current sensing resistor Rs, five times or more.

The analog-to-digital converter 156 converts the current flowing to the data driving circuit 130 into a digital signal during one frame based on the bias voltage amplified by the operational amplifier 154, generating the gamma driving power measurement M_SVDD.

The gamma driving power measurement M_SVDD is provided to the timing controller 140. The timing controller 140 may change the level or refresh rate of the image data DATA transferred to the data driving circuit 130 based on the gamma driving power measurement M_SVDD detected by the power management circuit 150.

In the shown example, current is detected by the gamma driving power SVDD, and the current sensing resistor Rs is connected in series between the gamma driving power SVDD and the data driving circuit 130.

In contrast, when the voltage of the gamma driving power SVDD is detected, a signal line transferring the gamma driving power SVDD between the gamma driving power SVDD and the data driving circuit 130 and a dummy channel may be disposed in parallel, and the variation in the voltage of the gamma driving power SVDD may be detected through the dummy channel.

Figure 12:
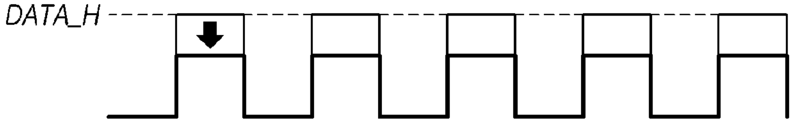
FIG. 12 is a view illustrating an example in which a level of image data is changed according to a variation in gamma driving power in a display device according to aspects of the present disclosure.
Figure 12:
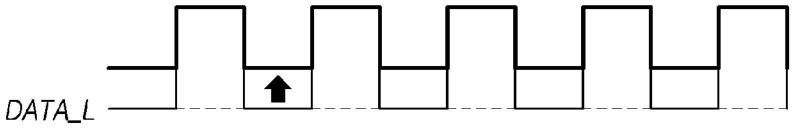

FIG. 12 is a view illustrating an example in which a level of image data is changed according to a variation in gamma driving power in a display device according to aspects of the present disclosure.

Referring to FIG. 12, in the display device 100 according to aspects of the present disclosure, as the area and resolution of the display panel 110 increase, the amount of the image data DATA displayed through the display panel 110 may increase, and the transition of image data DATA may be frequent.

If the transition of image data DATA so increases, the temperature of the source driving integrated circuit SDIC supplying the data voltage to the display panel 110 increases, and so does the temperature of the display panel 110. Such phenomenon may be more conspicuous when transition of image data DATA is more frequent, like when the image data is of a game or moving image.

Accordingly, in the display device 100 of the present disclosure, when the gamma driving power measurement M_SVDD is increased as the transition of image data DATA increases, the timing controller 140 may reduce the high level DATA_H of the image data DATA to correspond to the gamma driving power measurement M_SVDD (the case shown in FIG. 12(*a*)) or increase the low level DATA_L of the image data DATA (the case shown in FIG. 12(*b*), thereby reducing the level (peak-to-peak value) of the image data DATA.

As such, when the transition of image data DATA increases, it is possible to suppress the temperature of the data driving circuit 130 and enhance image quality by reducing the level of the image data DATA.

Figure 13:
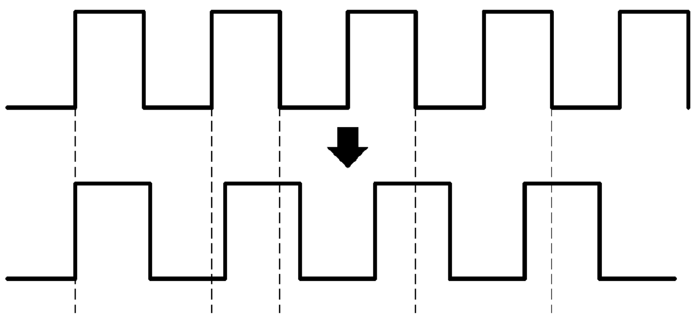
FIG. 13 is a view illustrating an example in which a refresh rate of image data is changed according to a variation in gamma driving power in a display device according to aspects of the present disclosure.

FIG. 13 is a view illustrating an example in which a refresh rate of image data is changed according to a variation in gamma driving power in a display device according to aspects of the present disclosure.

Referring to FIG. 13, in the display device 100 according to aspects of the present disclosure, when the gamma driving power measurement M_SVDD is increased as the transition of image data DATA increases, the timing controller 140 may reduce the refresh rate of the image data DATA to correspond to the gamma driving power measurement M_SVDD.

Illustrated is an example in which the timing controller 140 reduces the refresh rate of the image data DATA in a state of maintaining the level of the image data DATA constant.

In contrast, the timing controller 140 may change both the level of the image data DATA and the refresh rate of the image data DATA according to the gamma driving power measurement M_SVDD. In this case, in the image data DATA changed by the timing controller 140, as the high level DATA_H is reduced, the refresh rate may be reduced and, as the low level DATA_L is increased, the refresh rate may be reduced. Alternatively, as the high level DATA_H is reduced and the low level DATA_L is increased under the control of the timing controller 140, the refresh rate may be reduced.

As such, when the transition of image data DATA increases, it is possible to suppress the temperature of the data driving circuit 130 and enhance image quality by reducing the refresh rate of the image data DATA.

If the gamma driving power detection circuit 152 is so disposed in the power management module 150, the gamma driving power SVDD applied to the data driving circuit 130 may be comprehensively detected and, in this case, the image data DATA may be controlled to correspond to an increase in the temperature of the whole display panel 110.

Meanwhile, the data driving circuit 130 may include a plurality of source driving integrated circuits SDIC and may measure the variation in the gamma driving power SVDD applied to each source driving integrated circuit SDIC, selecting any source driving integrated circuit SDIC and controlling the image data DATA based on the selected source driving integrated circuit SDIC.

Figure 14:
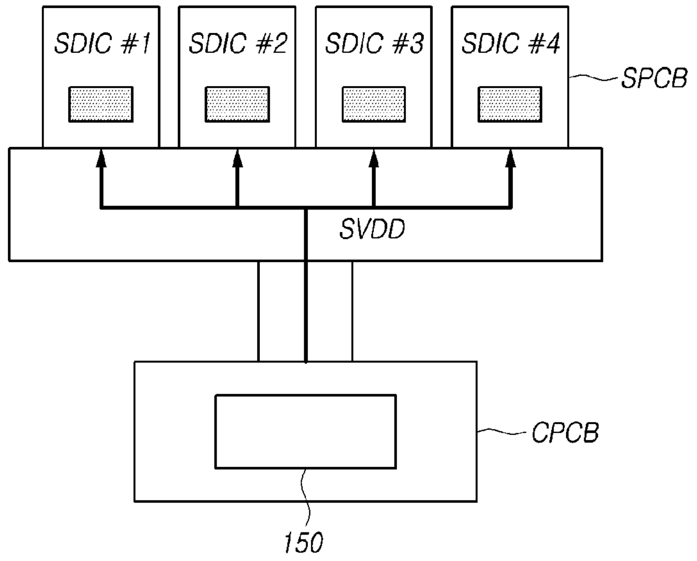
FIG. 14 is a view illustrating an example of a connection structure of a power management circuit disposed on a control printed circuit board and a plurality of source driving integrated circuits disposed on a source printed circuit board in a display device according to various aspects.

FIG. 14 is a view illustrating an example of a connection structure of a power management circuit disposed on a control printed circuit board and a plurality of source driving integrated circuits disposed on a source printed circuit board in a display device according to various aspects.

Referring to FIG. 14, the gamma driving power SVDD generated from the power management circuit 150 disposed on the control printed circuit board CPCB is transferred to the gamma circuit 134 of the data driving circuit 130 through the source printed circuit board SPCB.

The gamma circuit 134 voltage-divides the gamma driving power SVDD with a plurality of linear resistors arranged inside the data driving circuit 130, thereby generating the gamma reference voltages GMA1-GMAn.

In this case, when a plurality of source driving integrated circuits (e.g., SDIC #1 to SDIC #4) are arranged in the data driving circuit 130, the gamma driving power detection circuit may be disposed in the source driving integrated circuit SDIC.

In this case, it is possible to individually detect the variation in temperature due to the image data DATA, for each source driving integrated circuit SDIC. In this case, the source driving integrated circuit (e.g., SDIC #1) in which the variation in temperature due to a variation in the gamma driving power SVDD is largest may be selected from among the plurality of source driving integrated circuits SDIC #1-SDIC #4, and the level or refresh rate of the image data DATA may be individually controlled with respect to the selected source driving integrated circuit SDIC #1.

Figure 15:
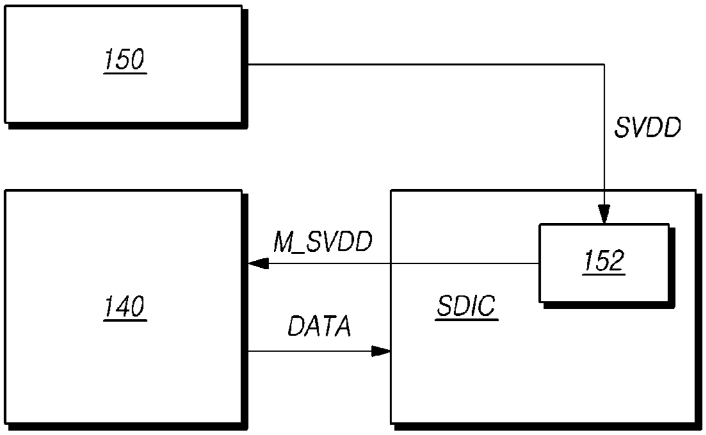
FIG. 15 is a system block diagram illustrating a structure of detecting a variation in gamma driving power to thereby control image data in a data driving circuit of a display device according to aspects of the present disclosure.

FIG. 15 is a system block diagram illustrating a structure of detecting a variation in gamma driving power to thereby control image data in a data driving circuit of a display device according to aspects of the present disclosure.

Referring to FIG. 15, a display device 100 according to aspects of the present disclosure may include a gamma driving power detection circuit 136 for measuring the gamma driving power SVDD, in the data driving circuit 130 which supplies the data voltage Vdata to the display panel 110.

More specifically, the gamma driving power detection circuit 136 may be disposed in the plurality of source driving integrated circuits SDIC constituting the data driving circuit 130.

The gamma driving power detection circuit 136 may be positioned in the source driving integrated circuit SDIC to measure the variation in the gamma driving power SVDD transferred from the power management circuit 150.

The configuration of the gamma driving power detection circuit 136 may be the same as the configuration illustrated in FIG. 11.

The gamma driving power measurement M_SVDD detected by the gamma driving power detection circuit 136 is transferred to the timing controller 140. The timing controller 140 may change the level or refresh rate of the image data DATA applied to the corresponding source driving integrated circuit SDIC with respect to the gamma driving power measurement M_SVDD transferred from the source driving integrated circuit SDIC.

In this case, the timing controller 140 may refer to a lookup table stored in a memory (not shown), extract the compensation value corresponding to the gamma driving power measurement M_SVDD, and apply the extracted compensation value to the image data DATA which is to be supplied to the source driving integrated circuit SDIC, thereby changing the level or refresh rate of the image data DATA.

Figure 16:
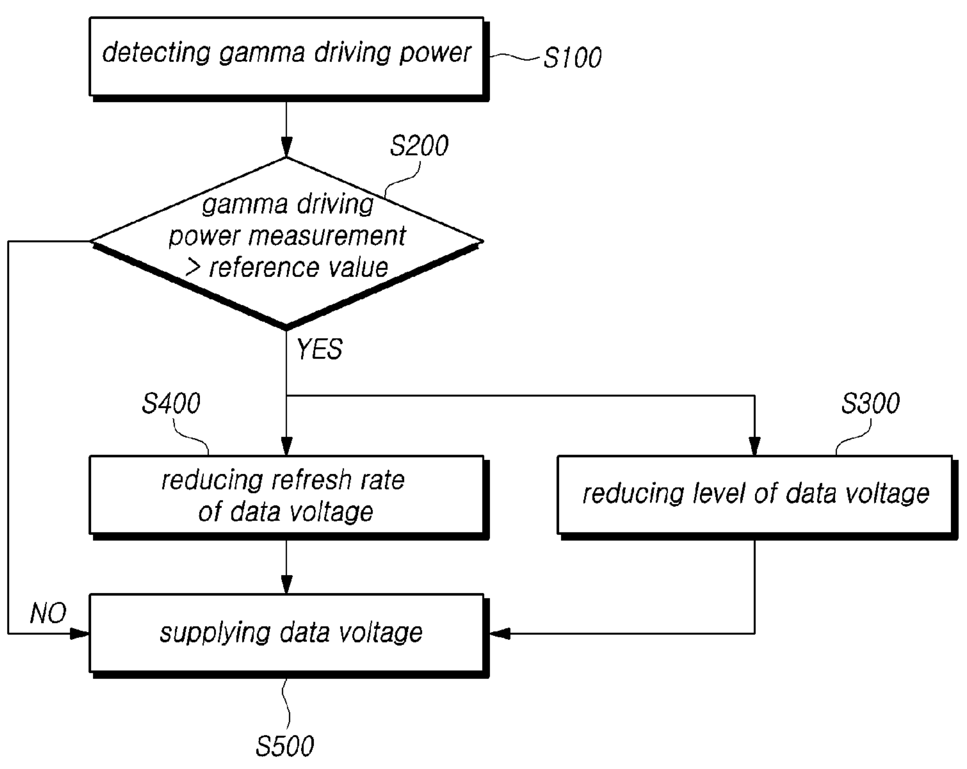
FIG. 16 is a flowchart illustrating a display driving method according to aspects of the present disclosure.

FIG. 16 is a flowchart illustrating a display driving method according to aspects of the present disclosure.

Referring to FIG. 16, a display driving method according to aspects of the present disclosure may include the step S100 of detecting gamma driving power SVDD, the step S200 of comparing a measurement M_SVDD of the gamma driving power with a reference value, the step S300 of reducing the level of the data voltage Vdata or the step S400 of reducing the refresh rate of the data voltage Vdata when the gamma driving power measurement M_SVDD exceeds the reference value, and the step S500 of supplying the changed data voltage Vdata.

The step S300 of reducing the level of the data voltage Vdata and the step S400 of reducing the refresh rate when the gamma driving power measurement M_SVDD exceeds the reference value may be performed simultaneously or only one of the steps may be selectively performed.

Further, as described above, when the gamma driving power measurement M_SVDD exceeds the reference value, the timing controller 140 may control the level or refresh rate of the image data DATA applied to the data driving circuit 130, thereby controlling the level or refresh rate of the data voltage Vdata supplied from the data driving circuit 130 to the display panel 110.

Through the display driving process, the display device 100 of the present disclosure may reduce the level or refresh rate of the image data DATA to correspond to the gamma driving power measurement M_SVDD when the gamma driving power measurement M_SVDD exceeds the reference value due to an increase in the transition of image data DATA, thereby suppressing an increase in the temperature of the data driving circuit 130 and enhancing image quality.

The foregoing aspects are briefly described below.

A display device 100 of the present disclosure comprises a display panel 110 where a plurality of gate lines GL, a plurality of data lines DL, and a plurality of subpixels SP are disposed; a gate driving circuit 120 configured to supply a scan signal SCAN to the plurality of gate lines GL; a data driving circuit 130 configured to convert digital image data DATA into an analog data voltage Vdata and supply the analog data voltage Vdata to the plurality of data lines DL; a power management circuit 150 configured to supply a gamma driving power SVDD for driving the data driving circuit 130 to the data driving circuit 130, and include a gamma driving power detection circuit 152 for detecting the gamma driving power SVDD; and a timing controller 140 configured to control the gate driving circuit 120 and controlling the digital image data DATA supplied to the data driving circuit 130 so that the analog data voltage Vdata supplied to the display panel 110 is changed according to a gamma driving power measurement M_SVDD detected by the gamma driving power detection circuit 152.

The gamma driving power SVDD is changed due to transition of the digital image data DATA.

The data driving circuit 130 includes a shift register 131 configured to convert the digital image data DATA received in a serial form into image data DATA in a parallel form in response to a control signal transferred from the timing controller 140 and output the image data DATA; a latch circuit 132 configured to transfer the image data DATA in the parallel form, on a per-line basis, to be simultaneously supplied to a plurality of source driving integrated circuits SDIC; a gamma circuit 134 configured to generate a plurality of gamma reference voltages GMA using the gamma driving power SVDD; a digital-to-analog converter 133 configured to convert the image data DATA in the parallel form into the analog data voltage Vdata in response to the plurality of gamma reference voltages GMA transferred from the gamma circuit 134; and an output buffer 135 configured to supply the analog data voltage Vdata to the plurality of data lines DL.

The gamma driving power SVDD is supplied as a driving voltage of the digital-to-analog converter 133 and the output buffer 135.

The gamma driving power detection circuit 152 includes a current sensing resistor Rs connected in series to the gamma driving power SVDD; an operational amplifier 154 connected between two ends of the current sensing resistor Rs to sense a bias voltage; and an analog-to-digital converter 156 configured to convert the bias voltage sensed by the operational amplifier 154 into a digital signal to generate the gamma driving power measurement M_SVDD.

The timing controller 140 is configured to reduce a level of the digital image data DATA when the gamma driving power measurement M_SVDD exceeds a reference value.

The timing controller 140 is configured to reduce a high level of the digital image data DATA or increases a low level of the digital image data DATA when the gamma driving power measurement M_SVDD exceeds the reference value.

The timing controller 140 is configured to reduce a refresh rate of the digital image data DATA when the gamma driving power measurement M_SVDD exceeds a reference value.

When the data driving circuit includes a plurality of source driving integrated circuits, the analog data voltage is changed based on a source driving integrated circuit with a largest variation in the gamma driving power among the plurality of source driving integrated circuits.

A data driving circuit 130 of the present disclosure comprises a shift register 131 configured to convert digital image data DATA received in a serial form into image data DATA in a parallel form and output the image data DATA; a latch circuit 132 configured to transfer the image data DATA in the parallel form, on a per-line basis, to be simultaneously supplied to a plurality of source driving integrated circuits SDIC; a gamma circuit 134 configured to generate a plurality of gamma reference voltages GMA using gamma driving power SVDD; a digital-to-analog converter 133 configured to convert the image data DATA in the parallel form into an analog data voltage Vdata in response to the plurality of gamma reference voltages GMA transferred from the gamma circuit 134; an output buffer 135 configured to supply the analog data voltage Vdata to a display panel 110 through a plurality of data lines DL; and a gamma driving power detection circuit 136 configured to detect the gamma driving power SVDD.

The gamma driving power SVDD is supplied as a driving voltage of the digital-to-analog converter 133 and the output buffer 135.

The gamma driving power detection circuit 136 includes a current sensing resistor Rs connected in series to the gamma driving power SVDD; an operational amplifier 154 connected between two ends of the current sensing resistor Rs to sense a bias voltage; and an analog-to-digital converter 156 configured to convert the bias voltage sensed by the operational amplifier 154 into a digital signal to generate the gamma driving power measurement M_SVDD.

The analog data voltage Vdata is controlled according to a gamma driving power measurement M_SVDD detected by the gamma driving power detection circuit 136.

A level of the analog data voltage Vdata is reduced when the gamma driving power measurement M_SVDD exceeds a reference value.

A refresh rate of the analog data voltage Vdata is reduced when the gamma driving power measurement M_SVDD exceeds a reference value.

A method for driving a display device including a display panel where a plurality of gate lines, a plurality of data lines, and a plurality of subpixels are disposed, a gate driving circuit supplying a scan signal to the plurality of gate lines, and a data driving circuit converting digital image data into an analog data voltage and supplying the analog data voltage to the plurality of data lines, according to the present disclosure, comprises detecting gamma driving power supplied to the data driving circuit (S100); comparing a measurement of the gamma driving power with a reference value (S200); controlling the analog data voltage when the gamma driving power measurement exceeds the reference value (S300 and S400); and supplying the analog data voltage to the display panel (S500).

Controlling the analog data voltage (S300) includes reducing a level of the analog data voltage Vdata when the gamma driving power measurement exceeds the reference value.

Controlling the analog data voltage Vdata (S300) includes reducing a high level of the analog data voltage Vdata or increasing a low level of the analog data voltage Vdata when the gamma driving power measurement exceeds the reference value.

Controlling the analog data voltage Vdata (S400) includes reducing a refresh rate of the analog data voltage Vdata when the gamma driving power measurement exceeds the reference value.

When the data driving circuit 130 includes a plurality of source driving integrated circuits, the analog data voltage is controlled based on a source driving integrated circuit with a largest variation in the gamma driving power among the plurality of source driving integrated circuits.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:

a display panel where a plurality of gate lines, a plurality of data lines, and a plurality of subpixels are disposed;

a gate driving circuit configured to supply a plurality of scan signals to the plurality of gate lines;

a data driving circuit configured to convert digital image data into an analog data voltage and supply the analog data voltage to the plurality of data lines;

a power management circuit configured to supply a gamma driving power for driving the data driving circuit to the data driving circuit through a gamma driving power line and include a gamma driving power detection circuit for detecting a variation of the gamma driving power through the gamma driving power line and generating a measurement of the gamma driving power; and a timing controller configured to control the gate driving circuit and control the data driving circuit to change the analog data voltage supplied to the display panel according to the measurement of the gamma driving power transferred from the gamma driving power detection circuit wherein, when the data driving circuit includes a plurality of source driving integrated circuits, the analog data voltage is changed based on a source driving integrated circuit with a largest variation in the gamma driving power among the plurality of source driving integrated circuits.

2. The display device of claim 1, wherein the gamma driving power is changed in accordance with transition of the digital image data.

3. The display device of claim 1, wherein the data driving circuit includes:

a shift register configured to convert the digital image data received in a serial form into image data in a parallel form in response to a control signal transferred from the timing controller and output the image data;

a latch circuit configured to transfer the image data in the parallel form, on a per-line basis, to be simultaneously supplied to a plurality of source driving integrated circuits;

a gamma circuit configured to generate a plurality of gamma reference voltages using the gamma driving power;

a digital-to-analog converter configured to convert the image data in the parallel form into the analog data voltage in response to the plurality of gamma reference voltages transferred from the gamma circuit; and an output buffer configured to supply the analog data voltage to the plurality of data lines.

4. The display device of claim 3, wherein the gamma driving power is supplied as a driving voltage of the digital-to-analog converter and the output buffer.

5. The display device of claim 1, wherein the gamma driving power detection circuit includes:

a current sensing resistor connected in the gamma driving power line;

an operational amplifier connected between two ends of the current sensing resistor and configured to sense a bias voltage; and an analog-to-digital converter configured to convert the bias voltage sensed by the operational amplifier into a digital signal to generate the measurement of the gamma driving power.

6. The display device of claim 1, wherein the timing controller is configured to reduce a peak-peak level of the digital image data when the measurement of the gamma driving power exceeds a reference value.

7. The display device of claim 6, wherein the timing controller is configured to reduce a high level of the digital image data or increase a low level of the digital image data when the measurement of the gamma driving power exceeds the reference value.

8. The display device of claim 1, wherein the timing controller is configured to reduce a refresh rate of the digital image data when the measurement of the gamma driving power exceeds a reference value.

9. A data driving circuit, comprising:

a shift register configured to convert digital image data received in a serial form into image data in a parallel form and output the image data;

a latch circuit configured to transfer the image data in the parallel form, on a per-line basis, to be simultaneously supplied to a plurality of source driving integrated circuits;

a gamma circuit configured to generate a plurality of gamma reference voltages using a gamma driving power transferred through a gamma driving power line from a power management circuit;

a digital-to-analog converter configured to convert the image data in the parallel form into an analog data voltage in response to the plurality of gamma reference voltages transferred from the gamma circuit;

an output buffer configured to supply the analog data voltage to a display panel through a plurality of data lines;

a gamma driving power detection circuit configured to detect a variation of the gamma driving power through the gamma driving power line and output a measurement of the gamma driving power, and a plurality of source driving integrated circuits, wherein the analog data voltage is changed based on a source driving integrated circuit with a largest variation in the gamma driving power among the plurality of source driving integrated circuits.

10. The data driving circuit of claim 9, wherein the gamma driving power is supplied as a driving voltage of the digital-to-analog converter and the output buffer.

11. The data driving circuit of claim 9, wherein the gamma driving power detection circuit includes:

a current sensing resistor connected in the gamma driving power line;

an operational amplifier connected between two ends of the current sensing resistor to sense a bias voltage; and an analog-to-digital converter configured to convert the bias voltage sensed by the operational amplifier into a digital signal to generate the measurement of the gamma driving power.

12. The data driving circuit of claim 9, wherein the analog data voltage is controlled according to the measurement of the gamma driving power detected by the gamma driving power detection circuit.

13. The data driving circuit of claim 12, wherein a peak-peak level of the analog data voltage is reduced when the measurement of the gamma driving power exceeds a reference value.

14. The data driving circuit of claim 12, wherein a refresh rate of the analog data voltage is reduced when the measurement of the gamma driving power exceeds a reference value.

15. A method for driving a display device, the display device including a display panel where a plurality of gate lines, a plurality of data lines, and a plurality of subpixels are disposed, a gate driving circuit supplying a scan signal to the plurality of gate lines, and a data driving circuit converting digital image data into an analog data voltage and supplying the analog data voltage to the plurality of data lines, the method comprising:

detecting a variation of a gamma driving power supplied to the data driving circuit in a power management circuit;

generating a measurement of the gamma driving power in the power management circuit;

comparing the measurement of the gamma driving power with a reference value in a timing controller;

controlling the analog data voltage when the measurement of the gamma driving power exceeds the reference value in the timing controller; and supplying the analog data voltage to the display panel in the data driving circuit, wherein, when the data driving circuit includes a plurality of source driving integrated circuits, the analog data voltage is controlled based on a source driving integrated circuit with a largest variation in the gamma driving power among the plurality of source driving integrated circuits.

16. The method of claim 15, wherein controlling the analog data voltage includes reducing a peak-peak level of the analog data voltage when the measurement of the gamma driving power exceeds the reference value.

17. The method of claim 15, wherein controlling the analog data voltage includes reducing a high level of the analog data voltage or increasing a low level of the analog data voltage when the measurement of the gamma driving power exceeds the reference value.

18. The method of claim 15, wherein controlling the analog data voltage includes reducing a refresh rate of the analog data voltage when the measurement of the gamma driving power exceeds the reference value.

* * * * *